United States Patent Office 2,856,094
Patented Oct. 14, 1958

2,856,094

BLENDS OF ALKENYLPHENOL-ALDEHYDE RESINS WITH POLYEPOXIDE RESINS AND METALLIC SURFACES COATED THEREWITH

Stewart W. Gloyer and Henry A. Vogel, Gibsonia, Pa., and Darrell D. Brenner, Waukegan, Ill., assignors to Pittsburgh Plate Glass Company No Drawing. Application August 16, 1955
Serial No. 528,860

10 Claims. (Cl. 220—64)

This invention relates to heat hardenable resin compositions and pertains more particularly to blends of epoxy resins with resinous condensation products of alkenylphenols and aldehydes.

The epoxy (ethoxyline) resins have had a considerable impact upon the coatings industry in recent years. They are very versatile materials which have found use in the manufacture of such materials as coating compositions, adhesives, molding compositions, and the like. In the manufacture of coating compositions the epoxy resins are sometimes utilized alone as the film forming material; however, in most instances the epoxy resins are combined with one or more other resinous materials such as urea-formaldehyde resins, melamine-formaldehyde resins, alkyd resins, and the like. The epoxy resins have also been combined with certain phenol-aldehyde resins, for example, those phenol-aldehyde resins obtained by the condensation of phenol ($C_6H_5OH$), or an alkyl substituted phenol, with formaldehyde. The compositions thus obtained are satisfactory for many applications; however, they have not been completely satisfactory for coating containers in which meat and other food products are packed in that the films do not satisfactorily withstand food processing temperatures and conditions. Deterioration of the films formed from such coating compositions is evidenced by pinholing, spangling, blushing, blistering and loss of adhesion.

It has now been discovered that epoxy resins can be modified with certain types of phenolic resins, specifically alkenylphenol-aldehyde resins, to give compositions which exhibit outstanding food processing resistance and also satisfactorily withstand fabrication into containers having even severe angles or compound curvatures. These compositions are particularly outstanding in that they cure to a hard, chemically resistant state in the presence of only very small quantities of an acidic catalyst, for example, about 0.5 percent to 3.0 percent by weight of the epoxy resin-phenolic resin blend, whereas conventional epoxy resin-phenolic resin blends, such as those containing phenol-aldehyde resins or alkyl substituted phenol-aldehyde resins, require at least 5 percent by weight of catalyst, and may require as much as 20 percent by weight of catalyst to effect a satisfactory cure. In addition to these advantages, compounds containing blends of epoxy resins and alkenylphenol-aldehyde resins are superior to conventional phenolic resin-epoxy resin blends in that the former are not toxic and impart no taste to food products, whereas the latter frequently impart undesirable tastes to food and beverages.

The above properties render the compositions of the present invention useful for such applications as liners for containers in which meat and other food products are processed and packed, for containers for soft drinks and alcoholic beverages, and for containers in which latex and latex paints, liquid detergents, and other chemicals are packaged.

The epoxy resin which is blended with an alkenylphenol-aldehyde resin in accordance with the present invention may vary considerably in chemical structure. These materials, which are ordinarily formed by the reaction of bisphenols with epichlorohydrin, range from viscous liquids to hard, brittle resins. A representative epoxy resin structure may be illustrated as follows:

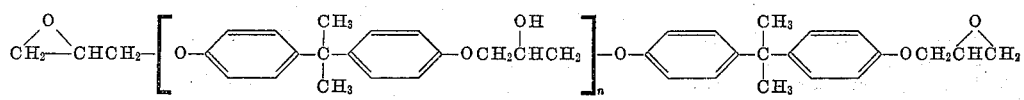

In the foregoing structure, $n$ is a number of a magnitude dependent upon the degree to which the etherification is carried. The most simple epoxy resin will contain at least 4 carbon atoms as illustrated by 1,2-epoxy-3,4-epoxy butane. More complex epoxy resins, such as those which result from the reaction of two or more moles of a diepoxide with one mole of a dihydric phenol, or the reaction of three or more moles of a diepoxide with one mole of a trihydric phenol, and diepoxides or polyepoxides derived from polyhydric alcohols such as sorbitol, pentaerythritol, or polyallyl alcohol, may also be used. Among the many phenolic compounds utilized in the preparation of epoxy resins are included the following:

Bis(4-hydroxy-phenyl)2,2-propane
4,4'-dihydroxybenzophenone
Bis(4-hydroxy-phenyl)1,1-ethane
Bis(4-hydroxy-phenyl)1,1-isobutane
Bis(4-hydroxy-phenyl)2,2-butane
Bis(4-hydroxy-phenyl)2,2-propane
Bis(4-hydroxy-tertiary butyl phenyl)2,2-propane
Bis(2-hydroxy-naphthyl)methane
1,5-dihydroxy-naphthalene The epoxy component of the epoxy resins may be selected from compounds of the following group:

1-chloro-2,3-epoxy propane (epichlorohydrin)
1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
1-chloro-2,3-epoxy octane
1-chloro-2-methyl-2,3-epoxy octane
1-chloro-2,3-epoxy decane Of the epoxy compounds, epichlorohydrin is the most desirable because of its general commercial availability and relatively low cost. However, other epoxy compounds may be used, particularly where special properties are desired in the resin.

The epoxy resins are frequently characterized by molecular weight, melting point and epoxide equivalency (grams of resin containing one equivalent of epoxide). For example, one series of commercially available epoxy resins has the following properties:

| Epoxy resin | Molecular weight | Melting point, °C. | Epoxide equivalency |
|---|---|---|---|
| A | Approximately 900 | 64–76 | 450–525 |
| B | Approximately 1,400 | 95–105 | 870–1,025 |
| C | Approximately 2,900 | 127–133 | 1,550–2,000 |
| D | Approximately 3,750 | 145–155 | 2,400–4,000 |

It has been found that the epoxy resin designated as "C" in the above table forms especially useful compositions when blended with alkenylphenol-aldehyde resins. However, other epoxy resins may also be used with good results. For example, the molecular weight of the epoxy resin may be as high as 4000 or even higher and the resin will still give excellent products when blended with alkenylphenol resins.

The alkenylphenol-aldehyde resins which are blended with epoxy resins of the types described hereinabove to give useful coating compositions in accordance with this invention, are described in copending applications, Serial Nos. 390,088, and 390,089, both filed November 3, 1953. The resins therein disclosed are prepared by the acidic or basic condensation of alkenylphenols with aldehydes, and particularly formaldehyde. Typical alkenylphenols which may be condensed with aldehydes to give useful resins include:

o-2-butenylphenol
p-2-butenylphenol
Di-2-butenylphenol
Tri-2-butenylphenol
Butenylcresol
Butenylcatechols
Butenyl-2,5-dichlorophenol
Butenyl-2,5-dinitrophenol
Butenyl-2,3-dimethoxyphenols
Butenylresorcinol
Dibutenylresorcinol
Butenylguaiacol
Di-butenylguaiacol
Tributenylguaiacol
2-chlorobutenylcresol
2-chlorobutenylphenol
2-iodobutenylphenol
o-Cyclopentenylphenol
p-Cyclopentenylphenol
Dicyclopentenylphenol
Tricyclopentenylphenol
Pentenylphenol
Pentenylcresol
Pentenylguaiacol
Chloropentenylphenol
Bromopentenylphenol
Chloropentenylguaiacol
Hexenylphenol
Hexenylcresol
Dihexenylcresol
Trihexenylcresol
Chlorohexenylphenol
Chlorohexenylchlorophenol
Chlorohexenylcatechol In addition to the above alkenylphenols, other alkenylphenols may also be condensed with aldehydes such as formaldehyde, to yield thermosetting resins which can in turn be blended with epoxy resins to produce useful compositions.

In the preparation of alkenylphenol-aldehyde resins by the processes described in the copending applications mentioned hereinabove, a mixture of alkenylphenols, including about 55 percent to 85 percent of monoalkenyl- phenols (both ortho- and para-monoalkenylphenols) and about 15 percent to 45 percent of higher boiling phenols, including di- and trialkenylphenols is generally utilized. Minor quantities of ethers and polyphenols may also be present. Mixtures of this type are obtained by the reaction of butadiene-1,3 with phenol. Mixtures of di- and trialkenylphenols, particularly mono-, di-, and tributenylphenols are especially preferred since resins prepared therefrom cure very rapidly to give light colored, hard, flexible films which are very resistant to the action of chemicals. Obvious economic advantages also attend the use of a mixture of alkenylphenols since the entire reaction mixture can be utilized, thus obviating the costly and time consuming procedure of first separating the monoalkenylphenols therefrom. However, if desired, individual alkenylphenols can be separated from the mixtures described above and utilized in the preparation of useful resins.

Preferably, the alkenylphenol-aldehyde resin is prepared by carrying out the condensation in the presence of an alkaline catalyst. Suitable alkaline materials include sodium hydroxide, potassium hydroxide, barium hydroxide, sodium carbonate, potassium carbonate, ammonia, hexamethylenetetraamine and the like. In addition to formaldehyde, other aldehydes such as acetaldehyde, propionaldehyde, butyraldehyde, crotonaldehyde, and the like may also be employed. Preferably, the aldehyde should contain only atoms of carbon, hydrogen, and oxygen.

The molar ratio of aldehyde to alkenylphenol utilized in carrying out the condensation reaction may be varied widely. Best results are obtained when about 2.0 moles of the aldehyde are utilized for each mole of the alkenylphenolic compound or compounds in the mixture. However, the ratio may be as low or lower than 0.5 to 1.0 or as high or higher than 5.0 to 1.0. When the ratio is much below the preferred 1.5 to 2.0 ratio, the resinous products tend to be hard and more difficulty processable. When the ratio is substantially above 2.0 to 1.0, good results are obtained but there is no economic advantage in utilizing such large excess of the aldehyde.

The condensation reaction is best carried out by first admixing the alkenylphenol and the catalyst under an inert atmosphere such as nitrogen, and/or in the presence of an alkali metal hydrosulfite such as sodium hydrosulfite, which prevents darkening due to the presence of quinones which are likely to be present together with the phenol, utilizing sufficient cooling to maintain the resulting reaction mixture at about room temperature (25° C.). When solution is obtained the aldehyde is added at a moderate rate and cooling is applied as needed to keep the temperature below about 35° C. Care should be taken to keep traces of air out of the reactor at all times during the condensation. Stirring is continued for about 48 hours at room temperature.

At the end of this time the reaction mixture is acidified to a pH of about 5.0 with a mineral acid such as hydrochloric acid or sulfuric acid, or a carboxylic acid such as acetic acid or propionic acid. Two layers are formed, a water layer and an alkenylphenolic resin layer. The water layer is drawn off and the water-insoluble layer of resin is water-washed four or five times. At this point it is advantageous to add about 0.1 percent by weight of a material such as an aminotetracarboxylic acid which forms a complex with any iron in the reaction mixture. The presence of uncomplexed iron is likely to cause darkening of the product. The resin is then dehydrated by vacuum stripping at steam temperatures and at a pressure of about 20 mm. to 55 mm. Alternatively, the water can be removed by adding butanol and then carrying out an azeotropic distillation.

Preferably, the resin is then heated in the presence of an inert gas until a Gardner-Holdt viscosity of U–W (70 percent solids in butanol) is obtained. The resin thus prepared is the most satisfactory material for blending with epoxy resins in coating compositions. However, it may sometimes be desirable to additionally react the alkenylphenol-aldehyde resin with a lower alcohol such as propanol or butanol, thus forming ether linkages in the resin.

It is also possible to prepare alkenylphenol-aldehyde resins in the presence of an acidic catalyst such as hydrochloric acid, acetic acid, oxalic acid, or the like. Alternatively, the catalyst may be dispensed with entirely, although higher reaction temperatures may then be required with attendant increase in darkening of the resinous product.

In accordance with the present invention the resins prepared by the condensation of alkenylphenols with aldehydes such as formaldehyde are blended with epoxy resins of the type described hereinabove. The respective quantities of the alkenylphenol-aldehyde resin and the epoxy resin which are blended into the compositions may be varied considerably. For example, amounts as low as about 5 percent by weight of the alkenylphenol-aldehyde resin to as much as 80 percent may be utilized with the epoxy resin being present in an amount of about 20 percent to 95 percent by weight. Preferably, however, the alkenylphenol-aldehyde resin is utilized in an amount of about 20 percent to 30 percent by weight, with the epoxy resin constituting from about 70 percent to 80 percent of the total weight of the resinous composition.

The alkenylphenol-aldehyde resin may be blended with the epoxy resin in any convenient manner. One preferred method consists in making up the epoxy resin into a solution of about 40 percent solids content in diacetone alcohol, butanol and/or xylene. A solution of the alkenylphenolic resin in a solvent such as butanol, xylene, isophorone, butyl Cellosolve, diacetone alcohol, or aromatic naphthas is then prepared and the two solutions combined. Blending is accomplished with the aid of any convenient means of agitation. It is to be understood that the above method of blending is by no means critical, and that many methods can be used to prepare the compositions of this invention.

Quantities of other resinous materials may be utilized in conjunction with the alkenylphenol-aldehyde resin to produce useful variations in the final composition. Included among such other materials are polyvinylacetal resins, particularly polyvinylbutyral, varnishes, alkyd resins, or copolymers in which one component is a vinyl monomer such as styrene, vinyl acetate, vinyl chloride, or the like. Such secondary modifiers are ordinarily employed in an amount of about 1 percent to 20 percent by weight of the total composition.

A particularly preferred modifier consists of a dark color, high melting, thermoplastic resin comprised of a complex mixture of various chemical components derived from southern pine wood. These constituents include acidic materials derived from resin acids and oxidized resin acids, high molecular weight resins and acidic phenolic materials in the form of substituted phenolic ethers, polyphenols, and other high molecular weight phenols. The exact composition of the pine oil thermoplastic resin is not known, although a number of its properties have been determined. For example, one commercially available resin of this type, sold by the Hercules Powder Company under the name Vinsol resin, has the following properties:

Softening point:
  (Hercules drop method), ° C. (° F.) __ 116 (240)
  (ASTM ring and ball), ° C. (° F.) ___ 108 (226)
Acid number _____ 94
Saponification number _____ 165
Unsaponifiable matter (ASTM D-1065), percent _____ 7.7
Gasoline soluble, percent _____ 17
Acetone insoluble, percent _____ 0.05
Toluene insoluble (ASTM D-269), percent__ 15
Gasoline insoluble, percent _____ 83
Petroleum ether insoluble, percent _____ 98

Methoxyl (—OCH$_3$) content (ASTM or AOAC), percent _____ 5.3
Oxygen absorption (300 lb./sq. inch, 7 days), percent _____ 0.25
Coefficient of cubical expansion per 1° C. (30–170° C.) _____ 0.00056
Density at 25° C. _____ 1.218
Specific heat (20–245° C.) _____ 0.50
Bulking density, lb./cu. ft., approximately:
  Flake _____ 42
  Pulverized _____ 40

The glycerol ester of resins having the above general properties may also be blended with compositions containing epoxy resins and alkenylphenol-aldehyde resins in accordance with this invention. A useful glycerol ester of this type has the following properties:

Acid number _____ 20
Pounds per gallon at 25° C. _____ 9.8
Color _____ Black
Softening point (Hercules drop method, ° C.) __ 140–155

A resin of this type is added in an amount of about 3 percent to 20 percent by weight, preferably 6 percent to 15 percent, of the total resinous composition, the quantity of the epoxy resin and the alkenylphenol-aldehyde resin being decreased proportionally. A particularly preferred composition contains about 60 percent to 70 percent polyepoxide, about 15 percent to 25 percent of alkenylphenol-aldehyde resin and about 5 percent to 15 percent of the pine wood resin. The addition of the pine wood resin has been shown to increase the adhesion to metal surfaces under food processing conditions and additionally imparts to the resulting composition the light golden color often desired in container coatings and closures.

Curing of the resinous compositions described hereinabove is accomplished by the addition of a small quantity of an acidic material, about 0.5 percent to 3.0 percent by weight, based upon the total weight of the epoxy resin and the alkenylphenol resin solids, the addition being made either as the composition is prepared, or at approximately the time the composition is to be utilized. Preferably, the acid is utilized in an amount of about 0.75 percent by weight of the resin solids and is added as a 10 percent solution in an alcohol such as butanol. Amounts smaller than 0.5 percent tend to produce undercured films, whereas amounts larger than about 3.0 percent tend adversely to affect film adhesion, flexibility, and other properties.

Either inorganic or organic acids may be utilized as catalysts. Phosphoric acid is especially preferred, although such other acids as citric acid, oxalic acid, sulfonic acid, p-toluene sulfonic acid and the like may also be employed to accelerate film hardening.

As indicated hereinabove, it is quite surprising that amounts of catalyst as low as 0.5 percent to 3.0 percent by weight of the resin solids so effectively catalyze the cure of the compositions of this invention, since other phenolic resin-epoxy resin blends require at least 5 percent by weight of catalyst and may require as much as 20 percent by weight of catalyst to effect a satisfactory cure. The advantages from both the economic and practical standpoint of utilizing a small quantity of catalyst are obvious.

Compositions comprising blends of epoxy resins and alkenylphenol-aldehyde resins may be applied to metals, glass, and other surfaces to produce clear, light colored films of any desired thickness. Best results are obtained from thin films of about 8 to 30 milligrams per 4 square inches per coat (dry film weight). These films adhere unusually well to the surface to which they are applied and withstand strong impacts and bending. Also, the films may be subjected to severe processing conditions such as are required in the preserving of food products, particularly meat products. Compositions of the invention are conveniently applied to metallic or other surfaces by roller coating techniques. For this purpose a viscosity of about 20 to 50 seconds in a number 4 Ford cup is preferred. Application may also be made by spraying, brushing, dipping, or other means. Pigments, fillers and the like may also be added.

The following examples illustrate in greater detail the preparation of resins by the condensation of alkenylphenols with aldehydes, and the use of such resins in combination with epoxy resins in coating compositions. The examples are not intended to limit the invention, however, for there are, of course, numerous possible variations and modifications.

EXAMPLE I

One hundred forty-eight parts of a mixture of monobutenylphenols (o- and p-monobutenylphenols) and 10 parts of sodium hydroxide in 100 parts of water were mixed under a nitrogen atmosphere with sufficient cooling to keep the temperature below 35° C. When a homogeneous solution was obtained, 162 parts of 37 percent formalin, methanol-free, containing 60 grams (2 moles) of solid formaldehyde, were added at a moderate rate and cooling was applied to keep the temperature below 35° C. Stirring was continued for 48 hours at room temperature. At the end of this time the reaction mixture was acidified to a pH of 5.0 with a mixture of concentrated hydrochloric acid and water (50 percent acid and 50 percent water) and the resulting water insoluble layer of the resin was washed four times with lukewarm water. The resin was then dehydrated by vacuum stripping at steam temperatures under 20 mm. to 50 mm. pressure for 2 to 4 hours. The viscosity at 25° C. was W–Z (Gardner-Holdt), and the resulting resin was completely miscible with ethanol, butanol, toluene, and xylene.

EXAMPLE II

One hundred forty-eight grams of a mixture of butenylphenols (including monobutenylphenols, dibutenylphenols, and tributenylphenols) were admixed with 162 grams of 37 percent formalin. Ammonium hydroxide (aqueous) was added in an amount to adjust the pH of the mixture to 10.5. The resulting mixture was then stirred for 48 hours at 25° C. The reaction mixture was allowed to stand after which the water layer was decanted and the remaining reaction mixture was vacuum distilled to remove excess water and ammonium hydroxide. A resin having a viscosity of $Z_5$–$Z_6$ was obtained.

EXAMPLE III

Two moles of a mixture of butenylphenols, including monobutenylphenols, dibutenylphenols and tributenylphenols, was admixed with 1 mole of formalin in the presence of concentrated hydrochloric acid. The resulting mixture was maintained at 25° C. for about 48 hours. The water layer was then drawn off and the remaining reaction mixture was distilled at reduced pressure until a viscosity of $Z_2$–$Z_3$ was obtained.

EXAMPLE IV

Example I is repeated except that 3 runs were made, utilizing furfural, crotonaldehyde and acetaldehyde respectively as the aldehyde component. In each instance a resinous condensation product suitable for blending with an epoxy resin was obtained.

EXAMPLE V

The following materials were charged into a glass-lined reactor:

24.6 pounds mixed butenylphenols (monobutenylphenols, di- and tributenylphenols)
27.0 pounds formalin solution (37 percent formaldehyde)
1.7 pounds sodium hydroxide
1.7 pounds water
0.12 pound sodium hydrosulfite The resulting mixture was cooled to about 75° F. to 80° F. and the reaction mixture agitated for 5 hours after which it was allowed to stand for an additional 43 hours. The reaction mixture was then acidified to a pH of 5.0 with 68 percent sulfuric acid and allowed to stand until a water layer settled out. The water layer was then drawn off and discarded. The wet resin (36.25 pounds) was treated with 0.04 pound of an aminotetracarboxylic acid known commercially as Sequestrene AA. The resin was then heated to 220° F. and stripped with an inert gas until a Gardner-Holdt viscosity of W at 75 percent solids in n-butanol was reached. The resin was then thinned with 10 pounds of n-butanol and filtered at 110° F. The product thus obtained had the following properties:

Weight per gallon_____ 8.45 pounds.
Solids_____ 66.2 percent at 110° C.
Viscosity_____ Q–R (Gardner-Holdt).

Thirty-six pounds of the resin thus prepared was admixed with 24.6 grams of Sequestrene AA and heated in the presence of an inert gas until a Gardner-Holdt viscosity of U–W was obtained at 70 percent solids in butanol.

EXAMPLE VI

A butenylphenol-formaldehyde resin was prepared according to the method of Example V. It was then diluted to 70 percent solids in butanol. The resulting solution had a Gardner-Holdt viscosity of U–W, a color of 10–12 and a weight per gallon of 8.5 pounds.

The alkenylphenolic resin solution thus prepared was formulated into a coating composition having the following components in the amounts set forth below:

| Component: | Parts by weight |
| --- | --- |
| Epoxy resin (molecular weight approximately 2900, melting point 127° C.–133° C., epoxide equivalency 1550–2000) | 135.1 |
| Butanol | 121.2 |
| Xylene | 101.5 |
| Alkenylphenol-aldehyde resin | 46.0 |
| Glycerol ester of southern pine wood resin (Vinsol ester gum) | 32.4 |
| Butyl Cellosolve | 164.3 |
| Isophorone | 54.6 |
| Diacetone alcohol | 65.6 |
| Aromatic naphthas | 65.6 |
| Phosphoric acid (added as 10 percent solution in butanol) | 3.5 |

The above formulation had a weight of 7.9 pounds per gallon, a total solids of 27 percent, and a viscosity (No. 4 Ford cup) of 25 seconds.

The formulation was roll coated at 12 to 14 pounds to give coating weights of 14 to 20 mgm./4 sq. in. The curing schedule may be about 8 minutes at 405° F. to 15 minutes at 415° F. without lowering fabrication properties of the film. A preferred cure of 10 minutes at 415° F. gives best process resistance and adhesion, although even a minimum cure of 8 minutes at 405° F. has given good results. Films prepared from the above formulation have a light golden color. Among the uses for this formulation are the following:

(1) Liners for containers in which meat is packed. Because of its excellent sulfide stain resistance, fabrication and adhesion, the formulation is outstanding for this purpose.

(2) Latex emulsion containers. This formulation has given good results in one coat applications of 14 to 18 mgm./4 sq. in., whereas most other systems, including vinyl formulations, require two coats of 30 to 35 mgm./4 sq. in. total coating weight for satisfactory performance.

(3) Linings for soft drink and alcoholic beverage cans. Because of its high epoxy resin content, this formulation represents an improvement in side seam scorch over the widely used oleoresinous primers. Its adhesion and resistance are excellent in water process tests and two coats of this material eliminate the use of a vinyl spray coat.

(4) Liquid detergent containers. It has been found that one coat having a film weight of 18 mgm./4 sq. in gives a system passing a 30 day immersion test in conventional liquid detergents held at a temperature of 130° F.

(5) Gold covered lacquers for closures and caps. The epoxy resin-alkenylphenol resin composition has excellent fabrication properties and gives a closure finish with resistance to acid food even without the use of a size coat or primer.

EXAMPLE VII

A butenylphenol-formaldehyde resin prepared according to the method of Example V was diluted to 70 percent solids in butanol to give a solution having a Gardner-Holdt viscosity of U–W.

The alkenylphenolic resin solution thus prepared was formulated into a coating composition having the following components in the amounts set forth below:

Component—Solids: Weight percent
Epoxy resin (M. W. approximately 2900, M. P. 127° C.–133° C., epoxide equivalency 1550–2000) _____ 61.0
Alkenylphenol-aldehyde resin_____ 21.7
Southern pine wood resin (Vinsol resin)_____ 14.4
Polyvinyl butyral _____ 2.9

100.0

Component—Solvents: Weight percent
Butanol _____ 9.9
Butyl Cellosolve _____ 21.4
Diacetone alcohol _____ 64.6
Xylol _____ 4.1

100.0

Catalyst level: Phosphoric acid (based on total apoxy resin-phenolic resin solids) _____ 0.744

Solids-solvent ratio

Solids _____ 27.9
Solvents _____ 72.1

Epoxy-phenol resin ratio

Epoxy resin _____ 73.7
Alkenylphenolic resin _____ 26.3

The above formulation gave excellent films when roll coated on tin plate. The films were acetone resistant and successfully withstood fabrication into containers in which food was processed without adversely affecting either the food or the film.

The compositions of this invention were compared with commercially available epoxy resin-phenolic resin blends in which the phenolic component is either phenol or an alkyl substituted phenol. Two different formulations were prepared with each phenolic resin; (1) a blend of 100 parts of an epoxy resin having a molecular weight of approximately 2900, a melting point of 127° C.–133° C., and an epoxide equivalency of 1550–2000, and 30 parts of the phenol-aldehyde resin, and (2) a blend of 100 parts of the epoxy resin and 61 parts of the phenol-aldehyde resin. As shown hereinbelow, both basic and acidic catalysts were utilized. The resinous components in each instance were dissolved in methyl ethyl ketone and films were drawn down on tin plate to a weight of 19 mgm./4 sq. in. and cured at varying temperatures. The metal was then punched into container ends and tested for acetone resistance, resistance to sterilization conditions, water processing, dog food processing and adhesion. The results are reported in the tables below:

[30 parts phenolic resin. 100 parts epoxy resin. Cure—30 minutes at 302° F.]

| Phenol | Catalyst | Acetone resistance (24 hours) | Sterilization, 30 minutes at 212° F. | Water processing, 60 minutes at 250° F. | Dog food processing, 75 minutes at 250° F. | Adhesion |
|---|---|---|---|---|---|---|
| Alkenylphenol-aldehyde resin of Example V. | Phosphoric acid, 3 percent of 85 percent solution based on resin solids. | Excellent | Excellent | Excellent | Excellent | Excellent. |
| Commercial resin A. | Potassium hydroxide, 3 percent based on resin solids. | Blushing,[1] slight blistering, soft. | Blushing, blistering, soft, loses adhesion. | Blushing, blistering soft, loses adhesion. | Blushing, blistering | Poor. |
| Commercial resin B. | ____do____ | ____do____ | Blistering, soft | ____do____ | Blushing, blistering, loses adhesion. | Poor. |

[1] "Blushing" is evidenced by the formation of light colored splotches in the film.

[30 parts phenolic resin. 100 parts epoxy resin. Cure—15 minutes at 392° F.]

| Phenol | Catalyst | Acetone resistance (24 hours) | Sterilization, 30 minutes at 212° F. | Water processing, 60 minutes at 250° F. | Dog food processing, 75 minutes at 250° F. | Adhesion |
|---|---|---|---|---|---|---|
| Alkenylphenol-aldehyde resin of Example V. | Phosphoric acid, 3 percent of 85 percent solution based on resin solids. | Excellent | Excellent | Excellent | Excellent | Excellent. |
| Commercial resin A. | Potassium hydroxide, 3 percent based on resin solids. | Poor | Blushing, soft, loses adhesion. | Blistering, heavy blushing, soft, loses adhesion. | Blushing, blistering, loses adhesion. | Fair. |
| Commercial resin B. | ____do____ | ____do____ | ____do____ | ____do____ | ____do____ | Do. |

[61 parts phenolic resin. 100 parts epoxy resin. Cure—30 minutes at 302° F.]

| Phenol | Catalyst | Acetone resistance (24 hours) | Sterilization, 30 minutes at 212° F. | Water processing, 60 minutes at 250° F. | Dog food processing, 75 minutes at 250° F. | Adhesion |
|---|---|---|---|---|---|---|
| Alkenylphenol-aldehyde resin of Example V. | Phosphoric acid, 3 percent of 85 percent solution based on resin solids. | Excellent | Excellent | Excellent | Excellent | Excellent. |
| Commercial resin A. | Potassium hydroxide, 3 percent based on resin solids. | (¹) | | | | |
| Commercial resin B. | ____do____ | Fair | Blushing, soft | Blushing, blistering, soft. | Blushing, blistering | Fair. |

¹ Gels completely shortly after preparation.

[61 parts phenolic resin. 100 parts epoxy resin. Cure—15 minutes at 392° F.]

| Phenol | Catalyst | Acetone resistance (24 hours) | Sterilization, 30 minutes at 212° F. | Water processing, 60 minutes at 250° F. | Dog food processing, 75 minutes at 250° F. | Adhesion |
|---|---|---|---|---|---|---|
| Alkenylphenol-aldehyde resin of Example V. | Phosphoric Acid, 3 percent of 85 percent solution based on resin solids. | Excellent | Excellent | Excellent | Excellent | Excellent. |
| Commercial resin A. | Potassium hydroxide, 3 percent based on resin solids. | (¹) | | | | |
| Commercial resin B. | ___do___ | Fair | Blushing, slight blistering, soft. | Slight blushing, blistering, soft, loses adhesion. | Blushing, blistering | Fair. |

¹ Gels completely shortly after preparation.

In the following examples, all of the compositions were catalyzed with 0.75 percent of a phosphoric acid catalyst, based on the resin solids weight. The compositions contained 66.0 percent of epoxy resin, 16.2 percent of the butenyl-phenol-formaldehyde resin, 14.9 percent of the thermoplastic resin obtained from southern pine wood described hereinabove, and 2.9 percent of polyvinyl butyral.

[Cure—15 minutes at 302° F.]

| Phenol | Acetone resistance (24 hours) | Sterilization, 30 minutes at 212° F. | Water processing, 60 minutes at 250° F. | Dog food processing, 75 minutes at 250° F. | Adhesion |
|---|---|---|---|---|---|
| Alkenylphenol-aldehyde resin of Example V. | Good | Excellent | Excellent | Excellent | Good. |
| Commercial resin A | Poor | Moderate blushing | Heavy blushing | Blushing, checks, slight corrosion | Do. |
| Commercial resin B | ___do___ | ___do___ | ___do___ | Blushing, checks, heavy corrosion | Fair. |

[Cure—15 minutes at 392° F.]

| Phenol | Acetone resistance (24 hours) | Sterilization, 30 minutes at 212° F. | Water processing, 60 minutes at 250° F. | Dog food processing, 75 minutes at 250° F. | Adhesion |
|---|---|---|---|---|---|
| Alkenylphenol-aldehyde resin of Example V. | Good | Excellent | Excellent | Excellent | Good. |
| Commercial resin A | Poor | Moderate blushing | Heavy blushing | Blushing, checks, rusts | Do. |
| Commercial resin B | ___do___ | ___do___ | ___do___ | Blushing, spangles | Do. |

The foregoing examples demonstrate the outstanding properties possessed by blends of epoxy resins with alkenylphenol-aldehyde resins as compared to blends of epoxy resins with resins prepared by the condensation of phenol or an alkyl-substituted phenol with an aldehyde. Moreover, when other alkenylphenols are substituted for the butenylphenols of the examples, or when other epoxy resins are utilized, the compositions obtained are substantially equivalent to those of the examples.

Although specific examples of the invention have been set forth hereinabove, it is not intended to limit the invention thereto, for it is apparent that various embodiments of the invention, in addition to those specifically disclosed, may be provided without departing from the spirit and scope of the invention as defined in the appended claims.

We claim:

1. A heat hardenable resinous coating composition comprising about 20 percent to 95 percent by weight of a polyepoxide resin which is a polyether derivative of a polyhydric phenol containing epoxide groups and being free from functional groups other than the epoxide and the hydroxyl groups, about 5 percent to 80 percent by weight of the resinous condensation product of a butenylphenol and an aldehyde, and about 0.5 percent to 3.0 percent by weight of an acidic catalyst selected from the class consisting of mineral acids and organic carboxylic acids, based on the total solids weight of the resinous components of said coating composition.

2. The composition of claim 1 wherein the acidic catalyst is phosphoric acid.

3. The composition of claim 2 wherein the polyepoxide is a polyglycidyl ether of bisphenol having a molecular weight of about 900 to 4000.

4. The composition of claim 3 wherein the polyepoxide resin is present in an amount of about 60 percent to 70 percent by weight and the butenylphenol-aldehyde resin in an amount of about 15 percent to 25 percent by weight of the total resin solids.

5. A heat hardenable resinous coating composition comprising about 60 percent to 70 percent by weight of a polyepoxide resin which is a polyether derivative of a polyhydric phenol containing epoxide groups and being free from functional groups other than the epoxide and the hydroxyl groups, about 15 percent to 25 percent by weight of the resinous condensation product of a butenylphenol and an aldehyde containing only atoms of carbon, hydrogen, and oxygen, about 5 percent to 15 percent by weight of a thermoplastic resinous material obtained from southern pine wood and possessing an acid number of about 94, a saponification number of about 165, a softening point of about 108° C., a methoxyl content of about 5.3 percent, and a density at 25° C. of 1.218, and from about 0.5 percent to 3.0 percent by weight of the resinous components, of phosphoric acid.

6. The resinous composition of claim 5 wherein the butenylphenol component is a mixture of butenylphenols consisting essentially of monobutenylphenols, dibutenylphenols, and tributenylphenols, and the aldehyde is formaldehyde.

7. The resinous composition of claim 6 wherein the polyepoxide resin has a molecular weight of about 900 to 4000.

8. A metallic article having adhered to the surface thereof a heat hardened film of the resinous coating composition of claim 1.

9. A metallic container for a food product having adhered to the inner surface thereof a heat hardened film of the resinous coating composition of claim 1.

10. A metallic container having adhered to the inner surface thereof a heat hardened film of the resinous coating composition of claim 5.

References Cited in the file of this patent

UNITED STATES PATENTS

| | | |
|---|---|---|
| 2,006,043 | Dykstra | June 25, 1935 |
| 2,699,413 | Seagren et al. | Jan. 11, 1955 |

OTHER REFERENCES

"Vinsol Resin," Modern Plastics, June 1942, pages 59, 102.

"Curing Agents for Epoxy Resins," Official Digest, November 1953, pages 825–827, 829.

UNITED STATES PATENT OFFICE
CERTIFICATE OF CORRECTION

Patent No. 2,856,094                          October 14, 1958

Stewart W. Gloyer et al.

It is hereby certified that error appears in the printed specification of the above numbered patent requiring correction and that the said Letters Patent should read as corrected below.

Column 8, line 53, for "12 to 14 pounds" read -- 12 to 14 pound --.

Signed and sealed this 26th day of May 1959.

(SEAL)
Attest:

KARL H. AXLINE                                ROBERT C. WATSON
Attesting Officer                            Commissioner of Patents